US012406332B2

(12) United States Patent
Nayak et al.

(10) Patent No.: US 12,406,332 B2
(45) Date of Patent: Sep. 2, 2025

(54) METHOD, APPARATUS, USER INTERFACE, AND COMPUTER PROGRAM PRODUCT FOR IDENTIFYING MAP OBJECTS OR ROAD ATTRIBUTES BASED ON IMAGERY

(71) Applicant: HERE GLOBAL B.V., Eindhoven (NL)

(72) Inventors: Amarnath Nayak, Mumbai (IN); Sandeep Belgaonkar, Thane (IN)

(73) Assignee: HERE GLOBAL B. V., Eindhoven (NL)

( * ) Notice: Subject to any disclaimer, the term of this patent is extended or adjusted under 35 U.S.C. 154(b) by 401 days.

(21) Appl. No.: 17/940,648

(22) Filed: Sep. 8, 2022

(65) Prior Publication Data

US 2024/0087092 A1    Mar. 14, 2024

(51) Int. Cl.
  *G06T 5/50*   (2006.01)
  *G06F 16/29*  (2019.01)
  *G06V 20/10*  (2022.01)

(52) U.S. Cl.
  CPC .............. *G06T 5/50* (2013.01); *G06F 16/29* (2019.01); *G06V 20/10* (2022.01); *G06V 2201/07* (2022.01)

(58) Field of Classification Search
  None
  See application file for complete search history.

(56) References Cited

U.S. PATENT DOCUMENTS

| 10,089,529 B2 * | 10/2018 | Larson ............ G01C 11/02 |
| 11,669,998 B2 * | 6/2023 | Lee ............ G06T 7/74 |
|  |  | 382/103 |
| 2010/0254595 A1 * | 10/2010 | Miyamoto ............ G06T 7/11 |
|  |  | 382/192 |

(Continued)

FOREIGN PATENT DOCUMENTS

| CN | 113538357 A | 10/2021 |
| DE | 102017001814 A1 | 10/2019 |

(Continued)

OTHER PUBLICATIONS

He Y, Ma L, Cui J, Yan Z, Xing G, Wang S, Hu Q, Pan C. AutoMatch: Leveraging Traffic Camera to Improve Perception and Localization of Autonomous Vehicles. InProceedings of the 20th ACM Conference on Embedded Networked Sensor Systems Nov. 6, 2022 (pp. 16-30). (Year: 2022).*

(Continued)

*Primary Examiner* — Michelle M Entezari Hausmann
(74) *Attorney, Agent, or Firm* — Jeffrey R. Moisan; HERE GLOBAL B.V.

(57) ABSTRACT

A method, apparatus, user interface, and computer program product are provided to receive an aerial image of a geographic region, identify at least one potential map object within the aerial image, determine at least one shadow area associated with the at least one potential map object within the aerial image, identify at least one camera proximate to the location of the at least one potential map object, capture image data of the area proximate to the least one potential (Continued)

map object via the at least one camera, and generate location data for the at least one map object or a road attribute based at least in part on the aerial image and image data of the area proximate to the least one potential map object or road attribute.

12 Claims, 7 Drawing Sheets

(56) References Cited

U.S. PATENT DOCUMENTS

| | | | | |
|---|---|---|---|---|
| 2015/0324989 | A1* | 11/2015 | Smith | G06T 7/00 382/278 |
| 2019/0164313 | A1* | 5/2019 | Ma | G06N 7/00 |
| 2021/0208601 | A1* | 7/2021 | Di Loreto | G08G 1/0116 |

FOREIGN PATENT DOCUMENTS

| | | |
|---|---|---|
| EP | 1975565 B1 | 5/2018 |
| WO | WO2012034637 A1 | 3/2012 |

OTHER PUBLICATIONS

Ibarra-Arenado M, Tjahjadi T, Pérez-Oria J, Robla-Gómez S, Jiménez-Avello A. Shadow-based vehicle detection in urban traffic. Sensors. Apr. 27, 2017;17(5):975. (Year: 2017).*

Zhu M, Zhang S, Zhong Y, Lu P. Peng H, Lenneman J. Monocular 3d vehicle detection using uncalibrated traffic cameras through homography. In2021 IEEE/RSJ International Conference on Intelligent Robots and Systems (IROS) Sep. 2, 20217 (pp. 3814-3821). IEEE. (Year: 2021).*

Leitloff J, Rosenbaum D, Kurz F, Meynberg O, Reinartz P. An operational system for estimating road traffic information from aerial images. Remote Sensing. Nov. 13, 2014;6(11):11315-41. (Year: 2014).*

Karaduman M, Cinar A, Eren H. UAV traffic patrolling via road detection and tracking in anonymous aerial video frames. Journal of Intelligent & Robotic Systems. Aug. 15, 2019;95(2):675-90. (Year: 2019).*

Barra-Arenado, et al., "Shadow Detection in Still Road Images Using Chrominance Properties of Shadows and Spectral Power Distribution of the Illumination," University of Cantabria and University of Warwick, Sensors (Basel). Feb. 13, 2020;20(4):1012. doi: 10.3390/s20041012. PMID: 32069938; PMCID: PMC7070959.

* cited by examiner

METHOD, APPARATUS, USER INTERFACE, AND COMPUTER PROGRAM PRODUCT FOR IDENTIFYING MAP OBJECTS OR ROAD ATTRIBUTES BASED ON IMAGERY

TECHNOLOGICAL FIELD

An example embodiment of the present invention relates to identifying map objects based on imagery, and more particularly, to using aerial imagery and image data of areas proximate to potential map objects, structures, road attributes, etc. in conjunction with one another to improve map data quality.

BACKGROUND

Capturing a "bird's eye view" of an area used to rely on aircraft flying over an area and capturing still images in photographs of the area below the aircraft. These images were difficult and costly to obtain such that initially they were limited to governmental and military use. Further, the image quality was relatively low, such that object identification in these photographs was difficult. Advances in camera technology led to the development of high-altitude photography, such as with the Lockheed U-2 spy plane capturing images from 90,000 feet at high resolution. Further advances have led to satellite-based aerial image capture, and as digital imagery has progressed, objects in these high-resolution digital satellite images have become discernable. The modern ubiquity of high-resolution aerial imagery has led to the use of such images in a variety of applications. Object detection in aerial imagery is used for global information services, construction planning, wildlife tracking, and a variety of other applications.

BRIEF SUMMARY

A method, apparatus, system, user interface, and computer program product are provided in accordance with an example embodiment described herein for identifying map objects based on aerial imagery, and more particularly, to using aerial imagery in conjunction with other image data to identify map objects, road attributes, etc. concealed by shadows in aerial imagery. Embodiments provided herein may include an apparatus comprising at least one processor and at least one memory including computer program code, the at least one memory and computer program code configured to, with the processor, cause the apparatus to at least receive an aerial image of a geographic region; identify at least one potential map object within the aerial image; determine at least one shadow area associated with the at least one potential map object within the aerial image; identify at least one camera proximate to the location of the at least one potential map object; capture image data of the area proximate to the least one potential map object via the at least one camera; and generate location data for the at least one map object or a road attribute based at least in part on the aerial image and image data of the area proximate to the least one potential map object.

The apparatus above may also utilize one or more aerial images of a geographic region which comprises an image of a building, wherein causing the apparatus to identify objects within the aerial image comprises causing the apparatus to identify rooftop objects on a roof of the building within the aerial image. This embodiment may also cause the apparatus to determine shadow areas associated with the map objects within the aerial image which comprises causing the apparatus to determine shadow areas associated with the rooftop objects based, at least in part, on image analysis of the rooftop objects.

All of the apparatus and other embodiments described herein may, in some embodiments, utilize automated vehicle cameras, other vehicle cameras, drone cameras, and/or traffic cameras. The apparatus may also, in some embodiments in response to the location data generated for at least one map object or road attribute, further utilize this data at least in part to generate routing data and alerts.

The routing data, in some embodiments, may be used to navigate an autonomous vehicle to the geographic region within which one or more potential map objects have been located; wherein the autonomous vehicle's camera system is used capture additional image data of the area proximate to the potential map object.

The image data of the area proximate to one or more potential map objects may be captured by at least two cameras in some embodiments and in these embodiments and others, when image data of a potential map object is not captured by two or more cameras the respective map object is flagged in one or more databases.

In some embodiments, the location of at least one road attribute may be identified within one shadow area associated with the at least one potential map object by way of image analysis of the proximate image data of the least one potential map object.

Another embodiment may be described as a computer program product comprising at least one non-transitory computer-readable storage medium having computer-executable program code portions stored therein, the computer-executable program code portions comprising program code instructions configured to receive an aerial image of a geographic region; identify at least one potential map object within the aerial image; determine at least one shadow area associated with the at least one potential map object within the aerial image; identify at least one camera proximate to the location of the at least one potential map object; capture image data of the area proximate to the least one potential map object via the at least one camera; and generate location data for at least one map object or a road attribute based at least in part on the aerial image and image data of the area proximate to the least one potential map object.

In some embodiments, the aerial image(s) of the geographic region may comprise an image of a building, wherein the program code instructions to identify objects within the aerial image comprise program code instructions to identify rooftop objects on a roof of the building within the aerial image. This embodiment and others may also feature program code instructions to determine shadow areas associated with the objects within the aerial image which may comprise program code instructions to determine shadow areas associated with the rooftop objects based on image analysis of the rooftop objects.

The computer program product may in some embodiments be further described as featuring the program code instructions configured to generate location data, in response to the location data generated for at least one map object or road attribute, further utilize the location data to generate routing data and/or alerts. The computer program product may yet also further include embodiments wherein the captured image data of the area proximate to the least one potential map object is flagged in one or more databases if the image data exceeds a variance threshold when compared to the captured aerial image data. In yet another embodiment, the aerial image data may be flagged in response to a shadow area exceeding a shadow threshold score. This score may be based in part on the darkness of the shadow.

In yet another embodiment, a user interface for providing a user a route to a destination, may be described as comprising the steps of receiving input upon a user device from the user that indicates a destination; accessing a geographic database to obtain data that represent roads in a region in which the user device is operating; determining a route to the destination by selecting road segments to form a continuous path to the destination; and displaying the determined route or portion thereof to the user, wherein the determined route avoids at least one road segment in response to location data of at least one map object or road attribute, wherein the location data of the at least one map object or road attribute is based at least in part on aerial image data of a potential map object which contains a shadow and ground-level image data of the area proximate to the at least one potential map object. The user interface above and others may also feature a route determined which avoids one or more map objects based on a vehicle type.

All the information, alerts, etc. may be displayed on an end user device (e.g., smartphone, tablet, etc.) and/or in a motor vehicle (e.g., built-in display). Also, a computer program product may be provided. For example, a computer program product comprising instructions which, when the program is executed by a computer, cause the computer to carry out the steps described herein.

BRIEF DESCRIPTION OF THE DRAWINGS

Figure 1:
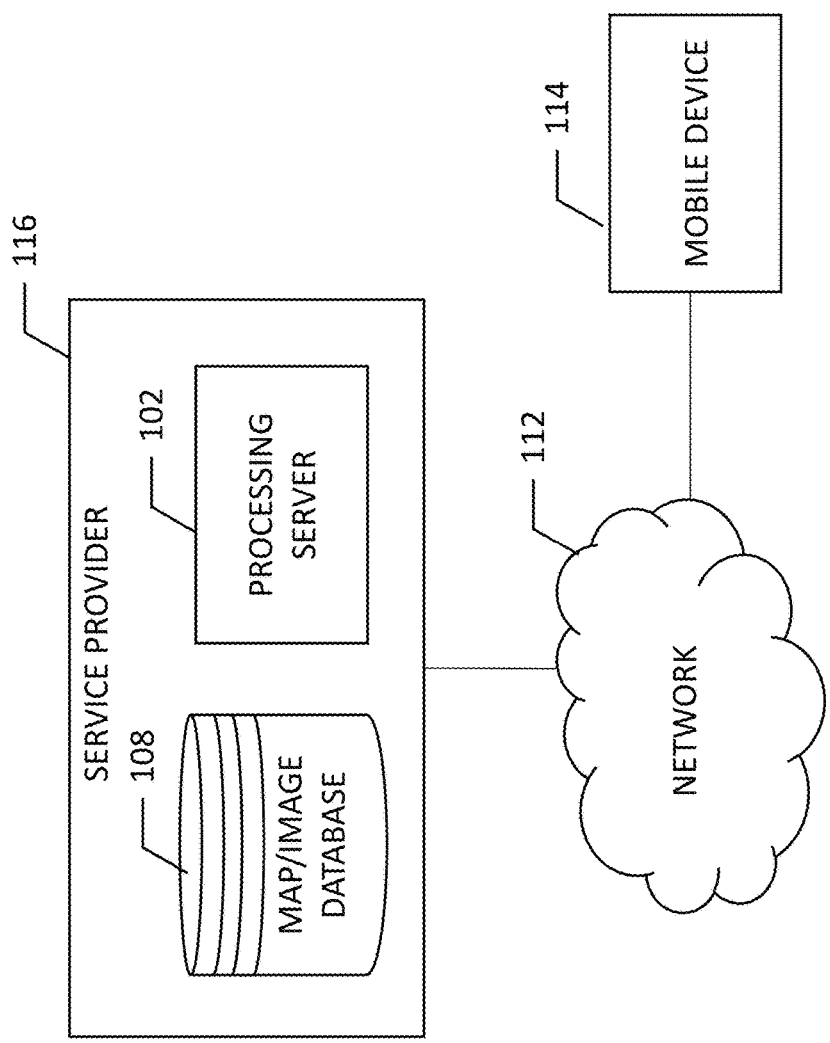
Figure 2:
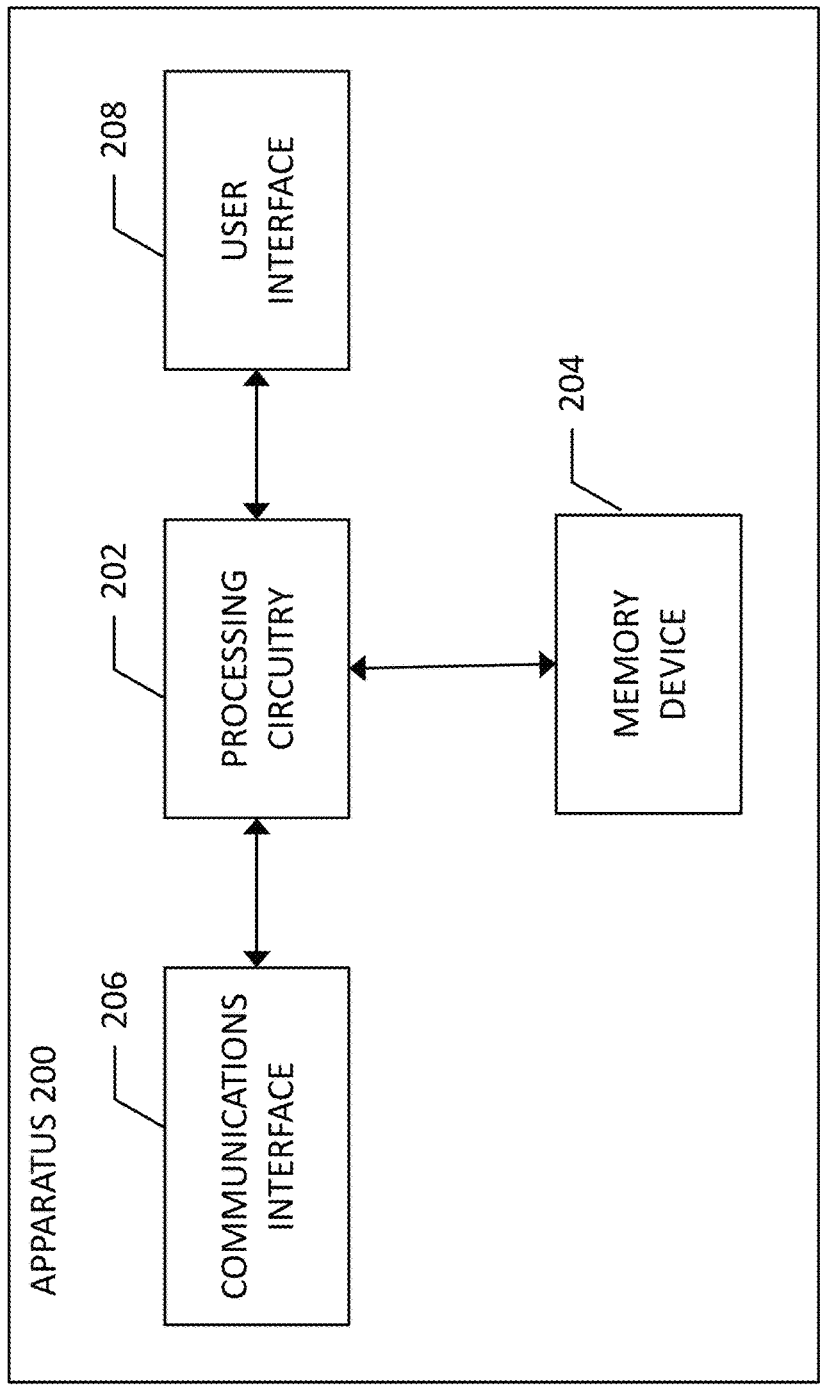
Figure 3:
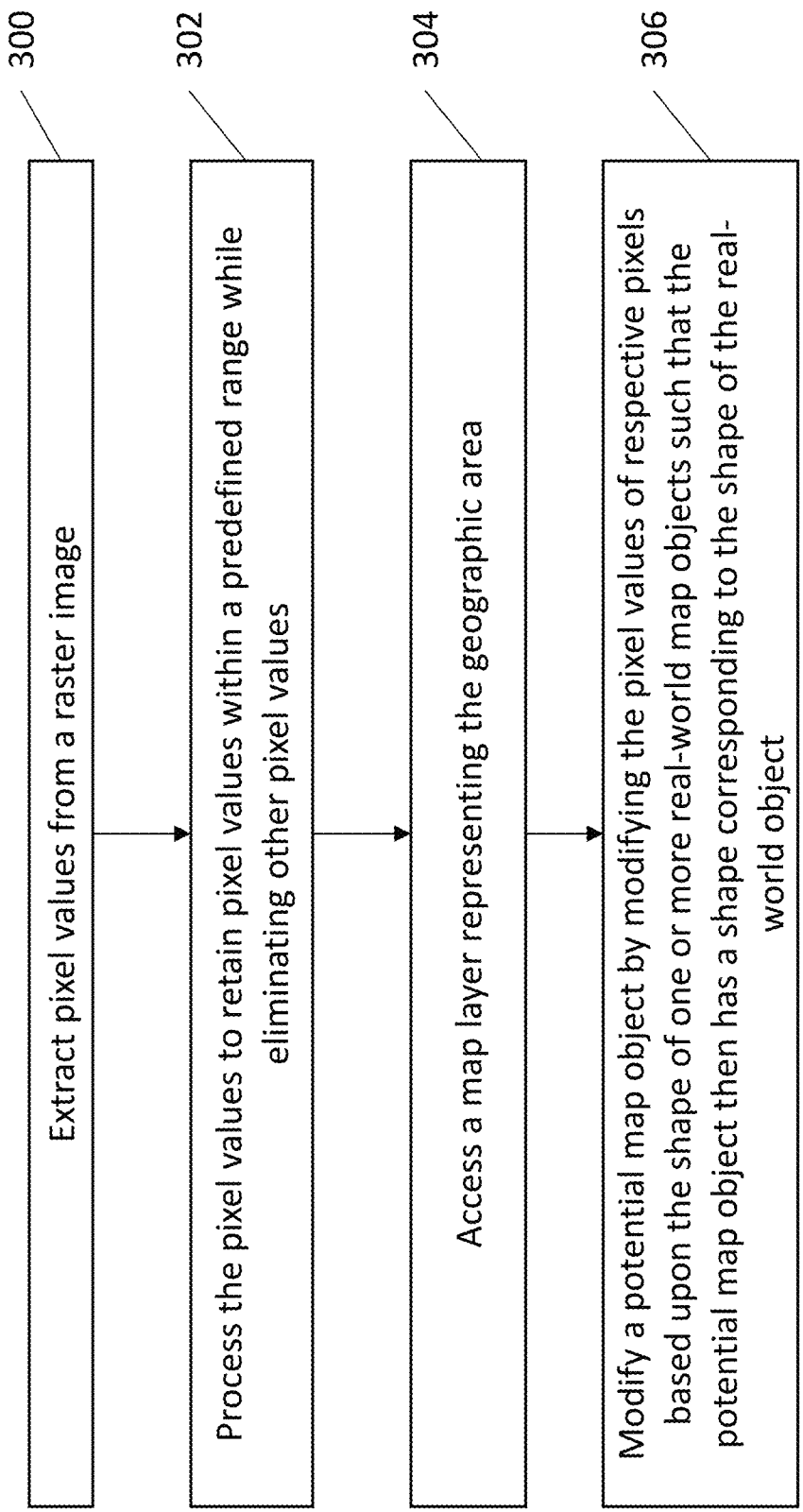
Figure 4:
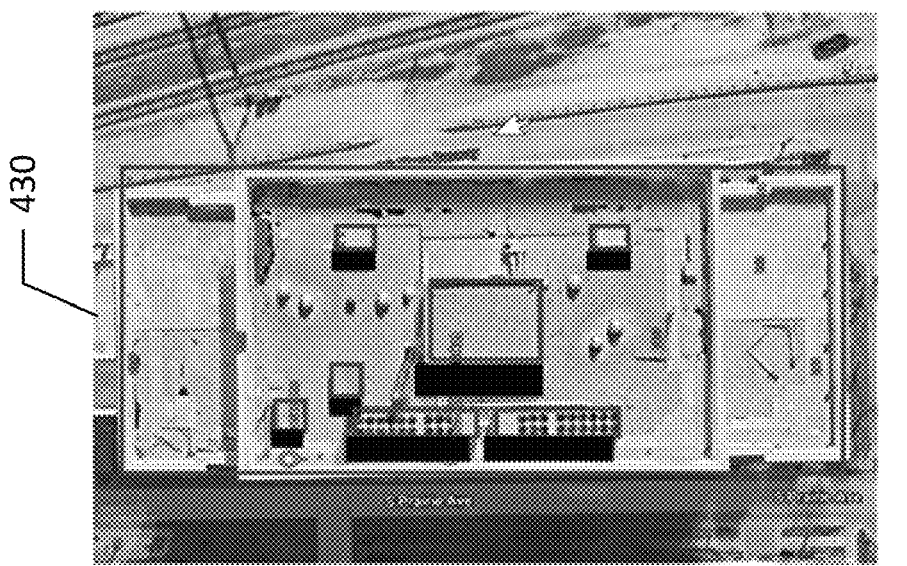
Figure 4:
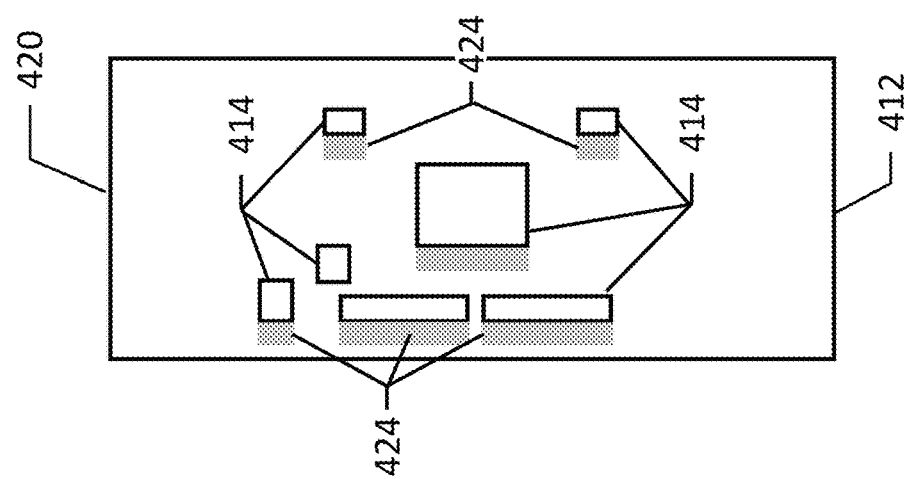
Figure 4:
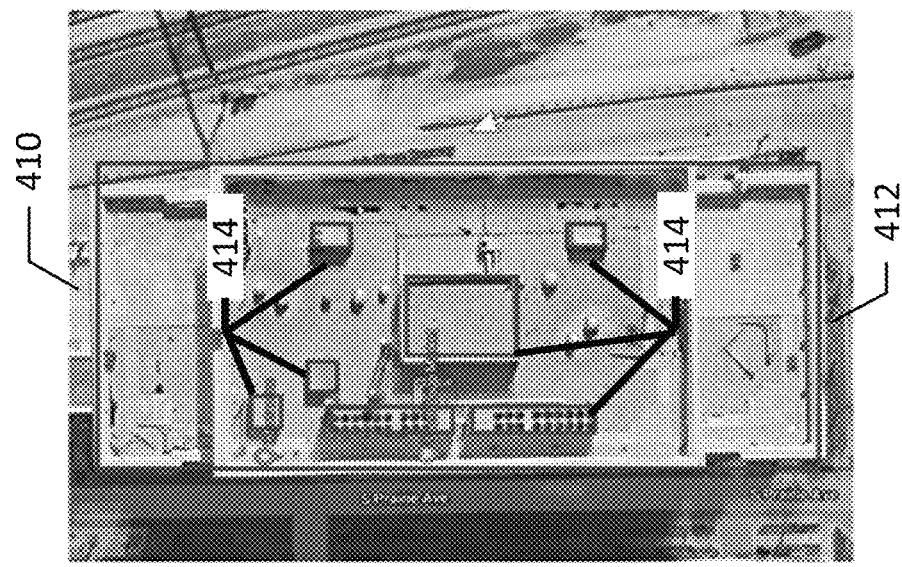
Figure 5:
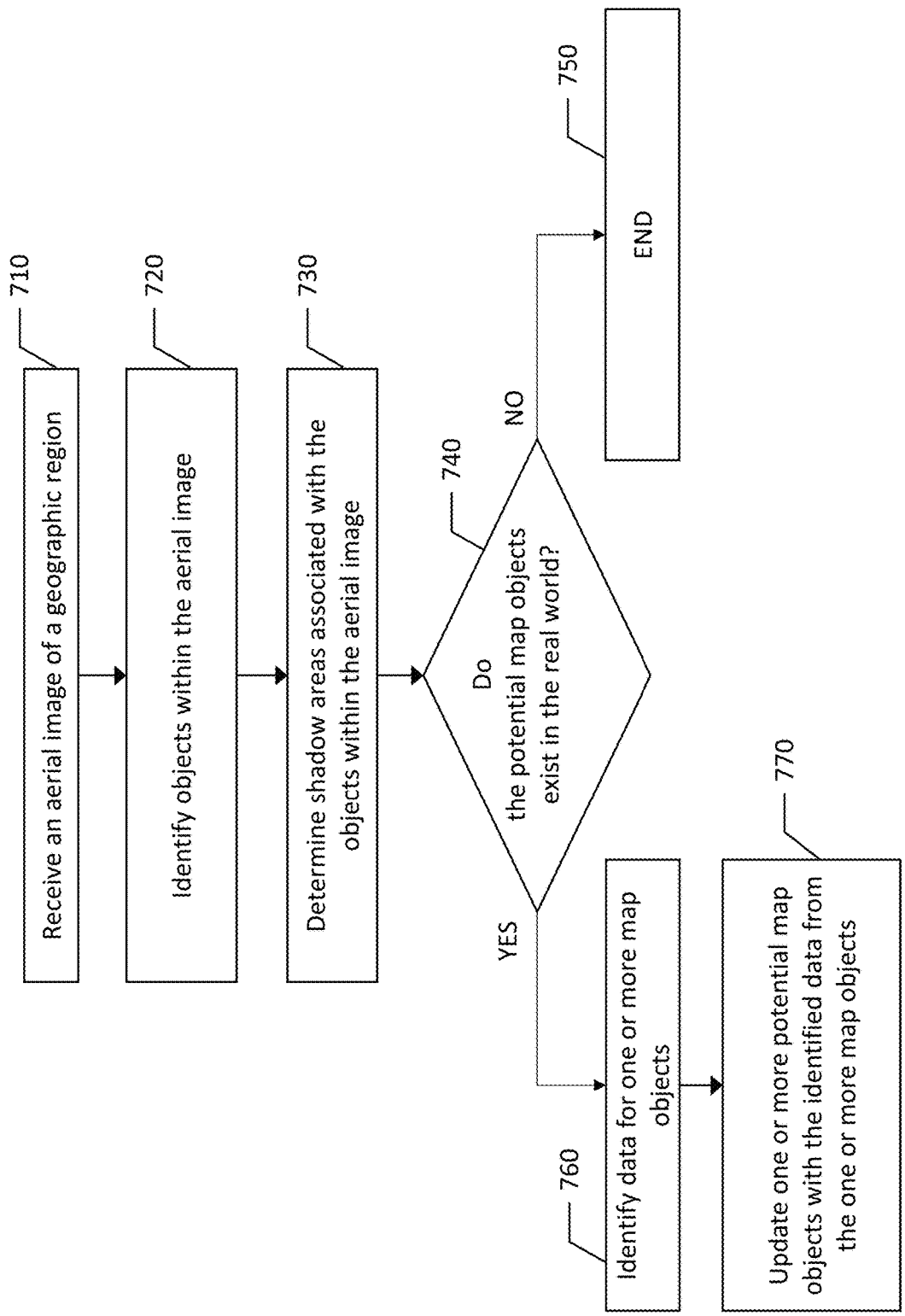
Figure 6:
Figure 7:
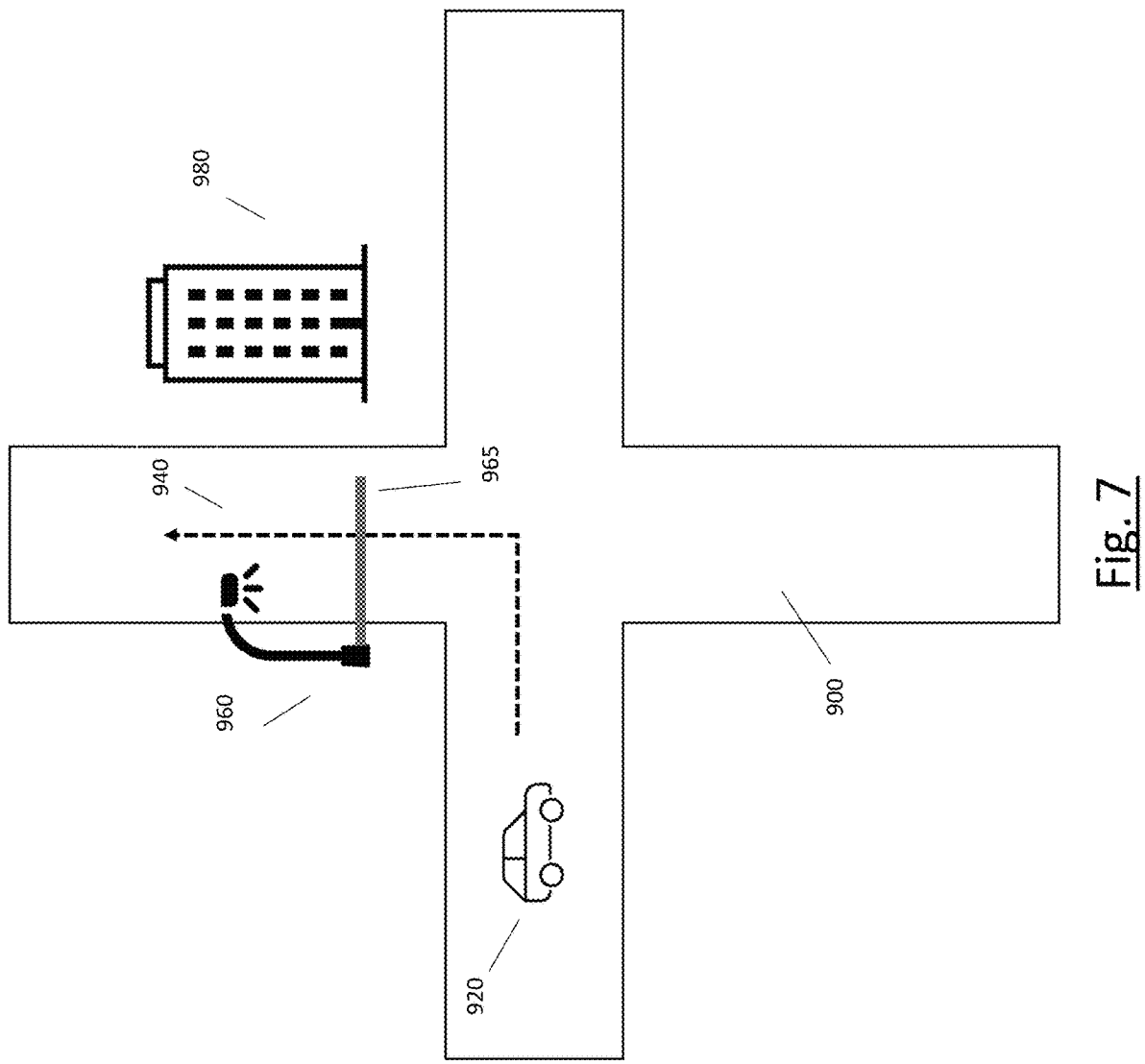

Having thus described example embodiments of the invention in general terms, reference will now be made to the accompanying drawings, which are not necessarily drawn to scale, and wherein:

FIG. 1 illustrates a communications diagram for identifying location data for map objects and/or road attributes based on aerial imagery in accordance with an example embodiment of the present disclosure;

FIG. 2 is a block diagram of an apparatus that may be specifically configured for identifying location data for map objects and/or road attributes based on aerial imagery in accordance with an example embodiment of the present disclosure;

FIG. 3 is a flowchart of a process for identifying shadow areas associated with objects according to an example embodiment of the present disclosure;

FIG. 4 is a graphical depiction of the identification of objects and their respective shadow areas within an aerial image according to an example embodiment of the present disclosure;

FIG. 5 is a block diagram of an apparatus that may be specifically configured for identifying location data for map objects and/or road attributes based on aerial imagery in accordance with an example embodiment of the present disclosure;

FIG. 6 is a graphical depiction of the identification of shadowed areas generated from objects based on analysis of an aerial image according to an example embodiment of the present disclosure; and FIG. 7 is an illustration of an embodiment of the system, apparatus, etc. used to generate routing data.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

As defined herein, a "computer-readable storage medium," which refers to a non-transitory physical storage medium (for example, volatile or non-volatile memory device), can be differentiated from a "computer-readable transmission medium," which refers to an electromagnetic signal.

A system, method, apparatus, and computer program product are provided herein in accordance with an example embodiment for identifying map objects based on aerial imagery, and more particularly, to using aerial imagery to identify potential map objects with shadow and then confirming the presence and/or dimensions of such a map object by use of cameras proximate to the location of the potential map object. The detection of map objects, such as light poles, antennas, trees, etc. is often difficult, particularly when there are heavy shadows present in aerial imagery. For example, a light pole may cast a shadow which is similar in size and shape to the pole itself. On an aerial image, it can be difficult to determine where the pole stops and shadow begins, thus creating unreliable map data. In another example, a line of poles or trees may cast shadows which create an aerial image within which it is unknown where any map objects sit as opposed to shadows created by the environment proximate to the given location. Thus, the processes described herein can identify map objects with greater certainty improving map data quality which can be used for many different applications included automated driving control, general vehicle routing, alert generation, etc.

Embodiments described herein identify potential map objects (and actual map objects) from aerial imagery. Aerial imagery is described herein as any images captured from above ground of buildings, structures, and objects on the ground. This includes images captured by satellites, aircraft, drones, etc. Using top-bottom view aerial imagery, embodiments described herein identify all objects on a street, on top of buildings, etc. such as light poles, street signs, water tanks, antenna, etc. Detection of such objects can be performed through object detection using shadow identification since objects sitting on a surface cast shadows during at least some parts of the day. Since shadows cast are dark, it can be difficult to determine if a dark area in an image is the result of a shadow or a portion of the map object. Embodiments described herein discern shadows from map objects in aerial imagery by using coordinated capture of additional imagery data proximate to the potential map object at ground-level, on roof top, etc.

To provide a method of identifying map object locations based on aerial imagery, a system as illustrated in FIG. 1 enables the ability to identify and distinguish objects, structures, and shadows based, at least in part, on aerial imagery analysis. FIG. 1 illustrates a communication diagram of an example embodiment of a system for implementing example embodiments described herein. The illustrated embodiment of FIG. 1 includes a service provider 116, a processing server 102 in data communication with a map and/or image database, e.g., map/image database 108 through a network 112, and one or more mobile devices 114. Additional, different, or fewer components may be provided. For example, many mobile devices 114 may connect with the network 112. The service provider 116 may include computer systems and network of a system operator. The processing server 102 may include the map/image database 108, such as a remote map server. The network may be wired, wireless, or any combination of wired and wireless communication networks, such as cellular, Wi-Fi, internet, local area networks, or the like.

The map/image database 108 may include any of a variety of information types. In an example embodiment where the service provider 116 is a map services provider, the database may include map data with image layers to depict aerial views together with map data, such as road segment data or link data, point of interest (POI) data, or the like. The map/image database 108 may also include cartographic data, routing data, and/or maneuvering data. The node data may be end points corresponding to the respective links or segments of road segment data. The road link data and the node data may represent a road network, such as used by vehicles, cars, trucks, buses, motorcycles, and/or other entities. Optionally, the map/image database 108 may include building information including building profiles. Building profiles can includes building zoning, building use such as residential, commercial, industrial, and information relating to building structures such as rooftop air conditioning units, rooftop water tanks, roof-mounted antennas, satellite dishes, window washing lifts, etc. These building profiles can be embodied as point-of-interest (POI) profiles, for example. The map/image database 108 can include data about the POIs and their respective locations in the POI records. In addition, the map/image database 108 can include event data such as weather event information in order to discern when aerial imagery was captured after a storm event to better identify issues that may have resulted from the storm event (e.g., debris on a rooftop, snow and snow melt, etc.).

The map/image database 108 may also include map object data. For example, a map object may be a bridge, and another example of a map object may be a railroad crossing. A wide variety of other map objects may exist including, for example, manhole covers, transitions between different types of road surfaces, medians, parking meters, fixed trash cans, light poles, street signs, foliage, dumpsters, various forms of infrastructure, or the like.

The map/image database 108 may also include POI data. A POI may be something like a stadium, concert venue, restaurant, park, school, bus stop, etc. The location of relevant POIs and/or map objects may be found by GPS coordinates or any other functionally capable means.

The map/image database 108 may yet also include road attribute data. Road attribute data includes data that represents features of a road that can impact driving conditions. For example, road attribute data may include data representing the shape of the road (e.g., slope, elevation, and grade), lane characteristics of the road, regulations associated with the road, road type, and objects located adjacent to the road.

The map/image database 108 may be maintained by a content provider e.g., a map developer or service provider. By way of example, the map developer or service provider can collect geographic data to generate and enhance the map/image database 108. There can be different ways used by the map developer or service provider to collect data. These ways can include obtaining data from other sources, such as municipalities or respective geographic authorities.

In addition, the map developer or service provider can employ field personnel to gather information on POIs or capture information relating to aerial images through the use of drones or other image capture devices. Also, remote sensing, such as aerial or satellite photography, can be used to generate map geometries directly or through machine learning as described herein.

The map/image database 108 may be a master map/image database stored in a format that facilitates updating, maintenance, and development. For example, the master map/image database or data in the master map/image database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing image analysis functions, by a device, such as by mobile device 114, for example. Further, data may be compiled relating to aerial imagery for buildings and other infrastructure within a geographic area. The compilation to produce the end user databases can be performed by a party or entity separate from the map developer or service provider. For example, a customer of the map developer or service provider, such as a maintenance service or building management provider can perform compilation on a received map/image database in a delivery format to produce one or more compiled image databases.

The processing server 102 may receive probe data from a mobile device 114. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, GNSS data, or the like. The mobile device 114 can capture images such as aerial images as a drone or drone controller and/or image data from the ground-level such as from a vehicle's camera systems or smartphone camera, for example. The server 102 may receive sensor data configured to describe a position of a mobile device, or a controller of the mobile device 114 may receive the sensor data from the positioning system of the mobile device 114 together with image data. The mobile device 114 may also include a system for tracking mobile device movement, such as rotation, velocity, or acceleration. Movement information may also be determined using the positioning system. The mobile device 114 may use the detectors and sensors to provide data indicating a location of a device such as a drone as it captures images for analysis as described herein.

An example embodiment of a processing server 102 may be embodied in an apparatus as illustrated in FIG. 2. The apparatus 200, such as that shown in FIG. 2, may be specifically configured in accordance with an example embodiment of the present disclosure for identifying map objects and their location based on aerial and proximate imagery. The apparatus 200 may include or otherwise be in communication with processing circuitry 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processing circuitry 202). The memory device may be configured to store information, data, content, applications, instructions, or the like, for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processing circuitry 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processing circuitry 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more user equipment 104 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may in turn be in communication with the processing circuitry 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

Example embodiments of the present invention may provide a mechanism for using aerial imagery to determine map objects and more particularly, a mechanism that can identify potential map objects and their location and/or dimensions then distinguish such objects from the object's shadows to confirm their location and/or dimensions.

The service provider 116 of example embodiments described herein uses map/image data to generate data identifying potential map objects and the shadows cast by such objects as well as the buildings and other map elements in a given area. The shadows may be derived in an accurate manner from raster imagery. By deriving the shadows from raster imagery, the service provider may generate the map including the buildings, map objects, and the shadows cast by the buildings and objects in a computationally efficient manner. Embodiments create accurate representations of the shadows with less noise and speckle. These embodiments can also account for shadows from other objects, such as trees, shrubs, vehicles, pedestrians, or the like. Thus, the resulting map data may provide for an enhanced ability to map object location data and exclude shadows by determining a more accurate representation of the shadows cast by the buildings and objects. The process of accurate identification of shadows cast by the buildings and other objects is described in greater detail in U.S. patent application Ser. No. 16/448,753, issued as U.S. Pat. No. 10,762,681, the contents of which are hereby incorporated by reference in their entirety.

According to an example embodiment described herein, satellite imagery is captured of a geographic area and all potential map objects are identified. These objects may be located at various elevations, for example at both street level and/or on the roof of a building. Accurate shadows may be generated, such as by service provider 116 of FIG. 1. Embodiments may generate map data having accurate building shadows and other shadows from raster imagery as described herein. With reference to the flowchart of FIG. 3, the service provider includes means, such as the processing circuitry 202 or the like, configured to extract pixel values from a raster image at 300 of one or more map objects, buildings, etc. such as by raster pixel value detection. The raster image may have been previously captured and may be stored, such as by the memory device 204 of the map generation system or by a database, cloud storage or other memory device, in communication with the map generation system. Alternatively, the service provider may process the raster imagery in real time or near real time as the raster imagery is captured and provided to the map generation system in order to extract the pixel values.

Based upon the pixel values extracted from a raster image, the pixels representative of shadows are identified. As shown in block 302 of FIG. 3, the service provider includes means, such as the processing circuitry 202 or the like, for processing the pixel values that have been extracted from the raster image so as to retain pixel values within a predefined range while eliminating other pixel values. The pixel values that are retained as a result of being within the predefined range represent shadows, while those pixels having pixel value that are eliminated represent features other than shadows, such as buildings, terrain, or other objects. In an example embodiment, pixel values that represent a black color or a color very nearly black are considered to be representative of shadows. Thus, the predefined range of one embodiment includes the pixel values representative of a black color in, one embodiment, the pixel values representative of a black color and colors that are nearly black. Thus, those pixels from a raster image having pixels value representative of a black color or colors that are nearly black are retained as representative of a shadow, while other pixels having pixel values representative of lighter color are eliminated, at least for purposes of the creation of an accurate representation of the shadows.

As shown in block 304 of FIG. 3, the service provider of an example embodiment also include means, such as the processing circuitry 202, the memory device 204 or the like, for accessing a map layer representative of the size, shape, and location of one or more geographic areas. For example, a building map layer may define 2D footprints representative of the size and shape of respective buildings with the 2D footprints positioned upon a map so as to be representative of the location of the respective buildings. The building layer may be stored by the memory device or may be stored by a database, cloud storage or other external memory device that is in communication with and may be accessed by the map generation system. The building layer may have been previously created, such as from the raster image or based upon other information. Alternatively, the building layer may be generated, such as from the raster image or from other information, at the time in which the building layer is accessed. Although the building layer may be generated in various manners, the building layer of an example embodiment may be generated, such as by the map generation system and, more particularly, by the processing circuitry, by identifying the pixels of the raster image having pixel values within a second predefined range, such as a predefined range of pixel values representative of the color(s) associated with buildings. The representations of one or more buildings within a building layer may be refined by grouping pixels having comparable pixel values into shapes representative of the corresponding shapes of one or more buildings. However, the building layer including the representations of one or more buildings may be generated in a wide variety of other manners, such as by being created manually or automatically using a geographic information system (GIS) and its software, being purchased from a vendor, etc. Also, although described herein and depicted in FIG. 3 to be performed after having processed the pixel values that have been extracted from the raster image so as to retain pixel values within a predefined range while eliminating other pixel values, the building layer may be accessed prior to processing the pixel values extracted from the raster image in other example embodiments.

The discussion above concerning a map layer for building data may be used in conjunction with one or more other map layers such as one containing map object data for light poles, signs, etc. in some embodiments. A layer for potential map objects not yet verified by proximate camera data (e.g., cameras on passing cars, end user mobile devices, etc.) may also be established and maintained in some embodiments. This same approach can also be applied to road attribute data, etc.

In accordance with an example embodiment, the service provider of an example embodiment includes means, such as the processing circuitry 202 or the like, for modifying the representation of the shadow in order to more accurately represent the shadow cast by one or more buildings, map objects, etc. See block 306 of FIG. 3. In this regard, the service provider, such as the processing circuitry, is configured to modify the pixel values of respective pixels based upon a shape of the one or more identified map objects. Thus, the representation of the shadow, as modified, has a shape corresponding to the shape of the one or more real-world buildings, map objects, etc. In an example embodiment, the representation of the shadow, as modified, has a shape that is identical to the shape of the one or more map objects.

An example of the above may be that of an aerial image captured of a street upon which a streetlight sits. As the plane, satellite, drone, etc. flies over there may be one or more shadows cast by the streetlight. In some cases, depending on the quality of the image captured, the shadow may appear to be part of the streetlight and create the impression the streetlight occupies an area larger than it does. Thus, the system, apparatus, etc. may in some embodiments flag objects which it determines to be streetlamps, etc. which contain black or dark portions as a potential map object and store it in one or more map layers.

This potential map object may then be further examined by the system, apparatus, etc. utilizing one or more additional images. In one embodiment, these additional images might be captured by a passing vehicle. The apparatus, system, etc. may, in this embodiment, send a signal to the car to capture the additional image or may analyze passively collected image data from cars, trucks, bikers, etc. passing through the area. This additional data may then be utilized by the apparatus to confirm the location of a given map object by revising the location data of one or more potential map objects by eliminating or modifying the shadowed areas of a given object.

In this example, as a car passed by the potential map object, the different perspective captured at ground level or near ground level demonstrates the actual dimensions of the streetlight, lamp pole, etc. Based on this data, and other sources such as historic data about common lamp post sizing, the apparatus, system, etc. may determine an accurate size and location for the given map object. The assessment can then be updated as other vehicles, etc. pass the map object from different directions.

Alternatively, tweaking the example above, a dark shadow may be present on an aerial image, the shadow being from an antenna on the roof top of a building which is then cast down on to street level. From an aerial image, the shadow cast down from rooftop might appear as a streetlamp or other map object at street level based solely on the aerial image. In this example, the passing cars, trucks, etc. would pass the location of the potential map object (e.g., the shadow of the antenna) and confirm there is no map object present. In this example, the potential map object would be flagged as the proximate image data could not confirm the presence of any map object.

Based on a determination of all shadows generated by potential map objects, buildings, etc. any remaining dark/black regions and spots may be detected using image analysis method as described above. Embodiments can compare aerial imagery over time as well to determine differences in shadow locations, etc. to better determine map object location data. For example, if a potential light pole it spotted and that light pole has the same dimensions and location typical of other light poles in the area, the system, apparatus, etc. might accept this light pole location information as accurate without the need to further clarify via proximate image data. Such a determination may be based on scoring the match (e.g., dimensions, location, etc.) between potential map objects in a given aerial image and know values for map objects stored in one more database.

FIG. 4 illustrates an example embodiment of identification of a building 412 in an aerial image 410. Image detection algorithms identify objects 414 on a roof of the building 412 and their respective 2D footprints illustrated by the borders of objects 414. Image 420 illustrates the representations of shadows 424 of the objects 414 on the roof of the building 412. The shadows 424 and footprints of the objects 414 are illustrated overlaid on the aerial image of the building 412 in image 430. Image 430 reflects a baseline of objects and their shadows as cast on the roof of the building and potentially beyond to the street below concealing/obfuscating accurate map data of the shadowed areas (in some cases). It should be noted that this approach and others may also be applied to objects 414 on ground-level (or elsewhere) as well and the rooftop example is non-limiting.

FIG. 5 illustrates an example embodiment of the system, apparatus, etc. where a map object with shadow exists. The system, apparatus, etc. receives one or more aerial images (block 710). As shown, one or more potential map objects are then identified in an aerial image (block 720) including objects on rooftops, ground-level, etc. The shadows of the objects may also be captured in the aerial image. Of note, some potential objects may include shadows that make the object appear larger because of shadow(s). The shadow areas of the potential map object may then be identified (block 730). The shadow areas of a given potential map object may be identified by any functional means including, in some embodiments, by use of additional image data captured proximate to the potential map object by one or more additional cameras. In some embodiments, the expected shadows of the objects based on historical data, machine learning, etc., may also be overlaid or compared to the aerial image to further refine or improve the assessed shadow area of a given map object.

In this embodiment, after (or in conjunction with) identifying the portions of a given potential map object which consist of shadows, the system, apparatus, etc. may also confirm if the potential map object exists in the real world. As mentioned above, aerial data can capture shadows which create the illusion of a map object being larger than it is or located in an area it does not actually exist. When such a potential map object is identified (e.g., an unusually tall or wide lamp post) the apparatus may utilize one or more cameras proximate to the location of the potential map object to confirm if this object actually exists (block 740) and, if it does exist, what size/dimensions it actually occupies. The actual size/dimensions as well as other data about one or more map objects such as the type of map object, etc. may be identified by the system, apparatus, etc. via the proximate image data. As discussed above, the proximate image data may be captured from a different perspective such as from a sedan passing through the geographic area. Based on this data obtained/extracted from the proximate image data of the area within which a potential map object sits, the data concerning the one or more potential map objects may then be updated (block 770).

For example, if a lamp post is seen in an aerial image and its width appears to be 5 ft (because of a dark shadow around its base) a sedan passing by might obtain images of the lamp post which show it is only 2 ft wide. The system, apparatus, etc. map then update the assessed 5 ft to 2 ft in map layers, databases, etc. to account for the additional width not present but merely created by shadow(s) in the aerial image.

Over time, machine learning models (see discussion below) and other models may learn to account for common issues created by shadows captured on aerial imagery for certain map objects/potential map objects.

Alternatively, continuing with this example, if a passing sedan does not capture proximate image data of a given potential map object, this map object map be flagged (block 750) as it may not exist. The flagged potential map object may then be acted upon by the system, apparatus, etc. for revision, deletion and/or adjustment or recapture of aerial image data (e.g., take another pass over the geographic area with an aerial camera).

FIG. 6 illustrates the detection process in greater detail, where an aerial image 810 is captured of a geographic area. The potential map objects 820 are identified and their shadows 840 are captured in the aerial image 810. In this example, large trees cast shadows onto the roadway and it is unclear where the tree ends and shadow begins. In some cases, the expected shadows generated from the potential map object (e.g., a tree) may be predicted by machine learning (or another model) and may be compared or overlaid on aerial image 810. Such projections may include data about common shadows cast by similar map objects given the day, time, solar/lunar calendars, etc.

In this example, if it is evident that the images captured shadows 840 which extend beyond the expected/predicted shadows, the system, apparatus, etc. will then turn to one or more cameras proximate the location of the tree (in this example). If the shadows extend beyond the predicted area, it creates uncertainty as to what is/is not shadow in the aerial image. The shadows may also conceal other map objects, road attributes, POIs, etc. Thus, the image data proximate to the one or more map objects/potential map objects provides a closer view which may feature no or less shadows. From this, the data concerning the map objects/potential map objects may be updated, flagged, etc.

It should be noted that in some examples, the system, apparatus, etc. may identify the type of map objects present via aerial images alone, or utilize proximate image data to confirm both the type (e.g., lamp, tree, etc.) of previously identified potential map objects and their dimensions, boundaries, location, etc.

Embodiments described herein may implement artificial intelligence and machine learning to establish map object location data from newer aerial images based on baseline aerial images, the expected or anticipated shadows, and/or proximate image data as described above. Machine learning is often used to develop a particular pattern recognition algorithm (e.g., an algorithm that represents a particular pattern recognition problem, such as the determination of on-street parking described herein) that is based on statistical inference. In some embodiments, the apparatus 200, such as the processing circuitry 202 or the like, receives large quantities of data (e.g., aerial imagery and proximate imagery) and determines whether a map object exists based on pattern recognition and map matching the recognized patterns to images (e.g., historic images) of a map/image database.

In some embodiments, the AI and models described herein use "deep learning". Deep learning is a subset of machine learning that generates models based on training data sets that have been provided. In some embodiments, the training model may use unsupervised learning techniques including clustering, anomaly detection, Hebbian Learning, as well as techniques for learning latent variable models such as an Expectation-maximization algorithm, a method of moments (mean, covariance), and Blind signal separation techniques, which include principal component analysis, independent component analysis, non-negative matrix factorization, and singular value decomposition.

Road attributes, buildings, etc. may also be detected/determined in the same or a different manner than as described above for map objects. For example, if a pothole or curve in the road (e.g., road attributes) are masked by shadow from above, the proximate image data may capture and account for such attributes. This may be triggered, in some examples, by a shadow darkness threshold. In some cases, an aerial photograph may contain very little to no shadows and thus a threshold score might be awarded to this image of 0.1 (a shadow threshold score). Images with lighter shadow through which something like a park bench, street sign, etc. are still clearly visible and accounted for may be given something a score of 0.5. As shown in FIG. 6, some shadows create very dark portions of images and the various map objects, road attributes, POIs, etc. covered by such shadows cannot be determined. The boundaries of the objects which cast the shadows (e.g., trees in this example) may also be muddled by the shadow. In such a situation, the system, apparatus, etc. may award a shadow threshold score of 0.8. Depending on historical records, machine learning, etc. over time the system, apparatus, etc. may learn what level of shadow threshold score is acceptable and which should be flagged for clarification and/or not used.

In this example, anything over 0.75 shadow threshold score is flagged for clarification and the system, apparatus, etc. utilizes one or more cameras proximate the location of the map object (which created the shadow) to determine what map objects, road attributes, etc. sit within the shadow cast upon the roadway.

FIG. 7 illustrates a diagram illustrative of a system, apparatus, etc. according to example embodiments of the present invention. As shown in FIG. 7, a sedan 920 is driving down a roadway 900. Upon this roadway sits a streetlamp 960 (i.e., a type of map object) and a building 980 (i.e., a POI). Additionally, the streetlamp 960 has cast a shadow 965 upon the roadway 900. In this example, the geographic area within which the sedan 920 is operating may be photographed from the air via a plane, drone, satellite, etc. and produce aerial image data. This aerial image data, a top-down view, may capture one or more images within which it is difficult to determine where the streetlight sits and what is shadow. This is because, in this example, the streetlamp, streetlight, etc. is black in color as is its shadow (shown as dark grey here to illustrate the example). Thus, from the top-down view, it may be difficult to assess the dimensions and location of the streetlamp 960.

In such a situation, the present system, apparatus, etc. may then utilize one or more camera systems proximate the location of the streetlamp 960 such a security camera of the building 980 or camera system of the sedan 920. The image data captured of the area proximate to the streetlamp 960 may then be compared to the data captured by aerial photography of the same map object/potential map object. This comparison allows for the exact, or at least more correct dimensions and location of a given map object to be confirmed by the system, apparatus, etc.

The shadow 965 may also obscure other map objects, road attributes, etc. such as manholes, lane lines, curbs, etc. and thus, in response to the map object casting a shadow on the given roadway, in some examples, the apparatus, system, etc. may capture image data of these other map objects, road attributes, etc. in addition to confirming the presence and dimensions of the map object casting the shadow.

In this example, the system, apparatus, etc. utilizes the aerial image data, proximate image data, and various other data sources to confirm the size and shape of both the lamp post and its shadow. In response to this determination, the system, apparatus, etc. may then generate alerts, routing guidance, etc. As shown in this example, the sedan 920 is provided routing guidance 940 which guides the sedan over a shadow 965. If only the top-down image data was utilized, it would be unclear if the shadow 965 was part of the lamp post or even a fallen lamp post or some other form of road debris/obstacle. Utilizing two separate sources of image data enables confirmation of where a given object is located and if it is safe to traverse through this area. The system, apparatus, etc. may also update one or more databases with this determination that the potential map object actually exists, as well as its location, dimensions, etc.

Road attributes, buildings, POIs, etc. may also be detected/determined in the same or a different manner than as described above for map objects. Shadow data/shadowed portions of buildings, POIs, road attributes, etc. may also be generated is a manner similar to what has been described above—with areas concealed by such shadows clarified by proximate image data.

In some embodiments, the determination of the proximity of cameras, camera systems, end user devices, vehicles, etc. to a given potential map object may be determined based on the current location of a given device on which the system is operating (e.g., an in-vehicle navigation system or a mobile device, for example) relative to potential map object(s) identified via aerial photography. The aerial photos, in one embodiment, may be analyzed by the system using GPS data, etc. to generate coordinates for potential map objects. The system, apparatus, etc. may then examine real time location data for camera(s) operating in the geographic area photographed from above. Within this area, the system, apparatus, etc. may create a virtual boundary or box a certain distance away from the potential map object. If any cameras are within this area (e.g., 10 M away from map object, 100 M away, etc.) they may be utilized to capture proximate image data of the potential map object. The location of the cameras may be detected by GPS data, cellular triangulation data, GNSS data, image data, etc.

It should be noted that the cars, trucks, etc. discussed in this application represents any vehicle. Such vehicles may be standard gasoline powered vehicles, hybrid vehicles, an electric vehicle, a fuel cell vehicle, and/or any other mobility implement type of vehicle (e.g., bikes, scooters, etc.). The vehicle includes parts related to mobility, such as a powertrain with an engine, a transmission, a suspension, a driveshaft, and/or wheels, etc. The vehicle may be a non-autonomous vehicle or an autonomous vehicle. The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to lane marking indicators (lane marking type, lane marking intensity, lane marking color, lane marking offset, lane marking width, or other characteristics) and driving commands or navigation commands. In one embodiment, the vehicle may be assigned with an autonomous level. An autonomous level of a vehicle can be a Level 0 autonomous level that corresponds to a negligible automation for the vehicle, a Level 1 autonomous level that corresponds to a certain degree of driver assistance for the vehicle, a Level 2 autonomous level that corresponds to partial automation for the vehicle, a Level 3 autonomous level that corresponds to conditional automation for the vehicle, a Level 4 autonomous level that corresponds to high automation for the vehicle, a Level 5 autonomous level that corresponds to full automation for the vehicle, and/or another sub-level associated with a degree of autonomous driving for the vehicle.

It should be noted that in some embodiments, the apparatus 10 may track and differentiate the types of vehicles on a given navigable link based on make/model, size, fuel type, transmission type, number of wheels, turn radius, vehicle features (e.g., lift kits, alloy wheels, droptop, etc.), age, value, etc. This data may be used for various functions including providing customized alerts and route guidance regarding left turns based on vehicle data and other factors.

In one embodiment, a graphical user interface (GUI) may be integrated in the vehicle, which may include assisted driving vehicles such as autonomous vehicles, highly assisted driving (HAD), and advanced driving assistance systems (ADAS). Any of these assisted driving systems may be incorporated into the GUI. Alternatively, an assisted driving device may be included in the vehicle. The assisted driving device may include memory, a processor, and systems to communicate with the GUI. In one embodiment, the vehicle may be an HAD vehicle or an ADAS vehicle. An HAD vehicle may refer to a vehicle that does not completely replace the human operator. Instead, in a highly assisted driving mode, a vehicle may perform some driving functions and the human operator may perform some driving functions. Such vehicle may also be driven in a manual mode in which the human operator exercises a degree of control over the movement of the vehicle. The vehicle may also include a completely driverless mode. The HAD vehicle may control the vehicle through steering or braking in response to the on the position of the vehicle and may respond to lane marking indicators (lane marking type, lane marking intensity, lane marking color, lane marking offset, lane marking width, or other characteristics) and driving commands or navigation commands. Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on the lane marking indicators (lane marking type, lane marking intensity, lane marking color, lane marking offset, lane marking width, or other characteristics) and driving commands or navigation commands.

In certain embodiments, the apparatus, etc. may be in communication with one or more camera systems. In some example embodiments, the one or more camera systems can be implemented in a vehicle or other remote apparatuses.

For example, the one of more camera systems may be located upon a vehicle, such as in the case with a vehicle camera, or instead of located upon a vehicle, may be proximate to it, such as in the case of a traffic camera. While embodiments may be implemented with a single camera such as a front facing camera in a consumer vehicle, other embodiments may include the use of multiple individual cameras at the same time. A helpful example is that of a consumer sedan driving down a road. Many modern cars have one or more cameras installed upon them to enable automatic braking and other types of assisted or automated driving. Many cars also have rear facing cameras to assist with automated or manual parking. In one embodiment of the current system, apparatus, method, etc. these cameras are utilized to capture images of vehicles, road signs, streets, etc. as a sedan, etc. travels around. The system, apparatus, etc. takes these captured images (via the camera systems) and analyzes them to determine if there are left turn indicators present on a certain street. Various types of left turns may be detected via any functional means.

The data captured concerning the vehicles and surroundings present may also come from traffic cameras, security cameras, trail cameras, smart phone/tablet cameras, or any other functionally useful source (e.g., historic data, satellite images, websites, etc.).

It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by processing circuitry 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one memory including computer program code, the at least one memory and computer program code configured to, with the processor, cause the apparatus to at least:
   receive an aerial image of a geographic region;
   identify at least one potential map object within the aerial image;
   determine at least one shadow area associated with the at least one potential map object within the aerial image;
   identify at least one traffic camera proximate to the location of the at least one potential map object;
   capture proximate image data of the least one potential map object via the at least one traffic camera;
   generate location data for the at least one map object based at least in part on the aerial image and proximate image data of the least one potential map object, and
   generate routing data in response to the location data generated for at least one map object, wherein the routing data generated is used to navigate an autonomous vehicle to the geographic region within which the potential map object has been located.

2. The apparatus of claim 1, wherein the aerial image of the geographic region comprises an image of a portion of a building, wherein causing the apparatus to identify objects within the aerial image comprises causing the apparatus to identify rooftop objects on a roof of the building within the aerial image.

3. The apparatus of claim 2, wherein causing the apparatus to determine shadow areas associated with the map objects within the aerial image comprises causing the apparatus to determine shadow areas associated with the rooftop objects based, at least in part, on image analysis of the rooftop objects.

4. The apparatus of claim 1, wherein at least one camera is an automated vehicle camera or drone camera.

5. The apparatus of claim 1, wherein the apparatus, in response to the location data generated for at least one map object, generates alerts.

6. The apparatus of claim 1, wherein the autonomous vehicle's camera system is used to capture additional image data of the area proximate to the potential map object.

7. The apparatus claim 6, wherein the apparatus generates the location data for at least one map object or road attribute from image data captured by at least two cameras.

8. The apparatus of claim 1, wherein the location of at least one road attribute is identified within one shadow area associated with the at least one potential map object by image analysis of the proximate image data of the least one potential map object.

9. A computer program product comprising at least one non-transitory computer-readable storage medium having computer-executable program code portions stored therein, the computer-executable program code portions comprising program code instructions configured to:
   receive an aerial image of a geographic region;
   identify at least one potential map object within the aerial image;
   determine at least one shadow area associated with the at least one potential map object within the aerial image;
   identify at least one traffic camera proximate to the location of the at least one potential map object;
   capture proximate image data of the area of the at least one potential map object via the at least one traffic camera; and
   generate location data for the at least one map object or a road attribute based at least in part on the aerial image and proximate image data of the area of the least one potential map object, and
   generate routing data in response to the location data generated for at least one map object, wherein the routing data generated is used to navigate an autonomous vehicle to the geographic region within which the potential map object has been located.

10. The computer program product of claim 9, wherein the aerial image of the geographic region comprises an image of a building, wherein the program code instructions to identify objects within the aerial image comprise program code instructions to identify rooftop objects on a roof of the building within the aerial image.

11. The computer program product of claim 10, wherein the program code instructions to determine shadow areas associated with the objects within the aerial image comprise program code instructions to determine shadow areas associated with the rooftop objects based on image analysis of the rooftop objects.

12. The computer program product of claim 9, wherein the program code instructions configured to generate location data, in response to the location data generated for at least one map object or road attribute, further utilize the location data to generate routing data and alerts.

* * * * *